United States Patent [19]
Seino

[11] Patent Number: 5,410,580
[45] Date of Patent: Apr. 25, 1995

[54] FUEL ASSEMBLY FOR THERMAL NEUTRON TYPE REACTOR

[75] Inventor: Takeshi Seino, Yokohama, Japan

[73] Assignee: Kabushiki Kaisha Toshiba, Kawasaki, Japan

[21] Appl. No.: 39,238

[22] PCT Filed: Aug. 26, 1991

[86] PCT No.: PCT/JP91/01125
§ 371 Date: Apr. 26, 1993
§ 102(e) Date: Apr. 26, 1993

[87] PCT Pub. No.: WO93/04479
PCT Pub. Date: Mar. 4, 1993

[51] Int. Cl.$^6$ .............................................. G21C 3/328
[52] U.S. Cl. ...................................... 376/435; 376/170
[58] Field of Search ............. 376/435, 428, 267, 172, 376/173, 170

[56] References Cited

U.S. PATENT DOCUMENTS

| | | | |
|---|---|---|---|
| 3,802,995 | 4/1974 | Fritz et al. | 376/435 |
| 3,844,886 | 10/1974 | Crowther | 376/435 |
| 3,933,582 | 1/1976 | MacNabb | 376/435 |
| 4,652,416 | 3/1987 | Millot | 376/435 |

FOREIGN PATENT DOCUMENTS

| | | |
|---|---|---|
| 0456969 | 11/1991 | European Pat. Off. |
| 2552921 | 4/1985 | France |
| 62-24183 | 2/1987 | Japan |
| 62-276492 | 12/1987 | Japan |
| 2147452 | 5/1985 | United Kingdom |

*Primary Examiner*—Daniel D. Wasil
*Attorney, Agent, or Firm*—Foley & Lardner

[57] ABSTRACT

There is provided a fuel assembly for a thermal neutron type reactor in which fuel rods utilizing U-235 enriched uranium-oxide are bundled in a lattice arrangement, and a portion of the fuel rods in the lattice arrangement is substituted with MOX fuel rods provided with no U-235 enriched uranium-oxide fuel portion and no natural or depleted uranium-oxide blanket portion.

7 Claims, 10 Drawing Sheets

CONTROL ROD SIDE

CONTROL ROD SIDE
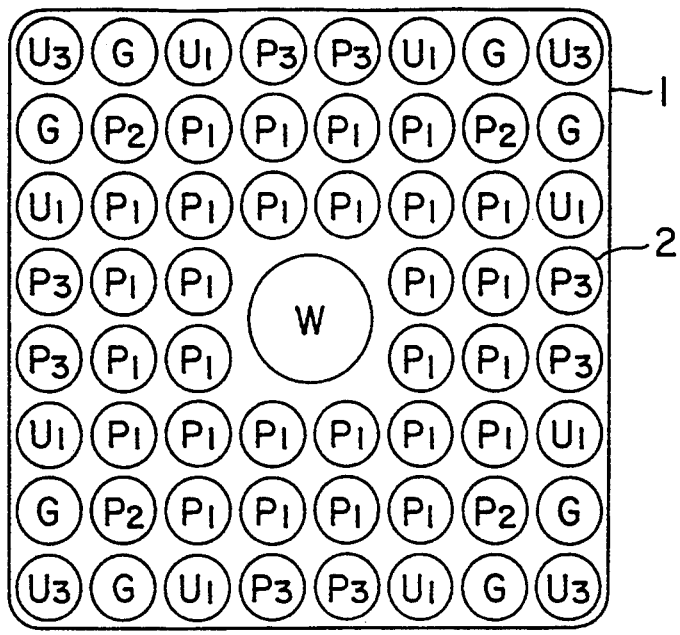
F I G. 2 A
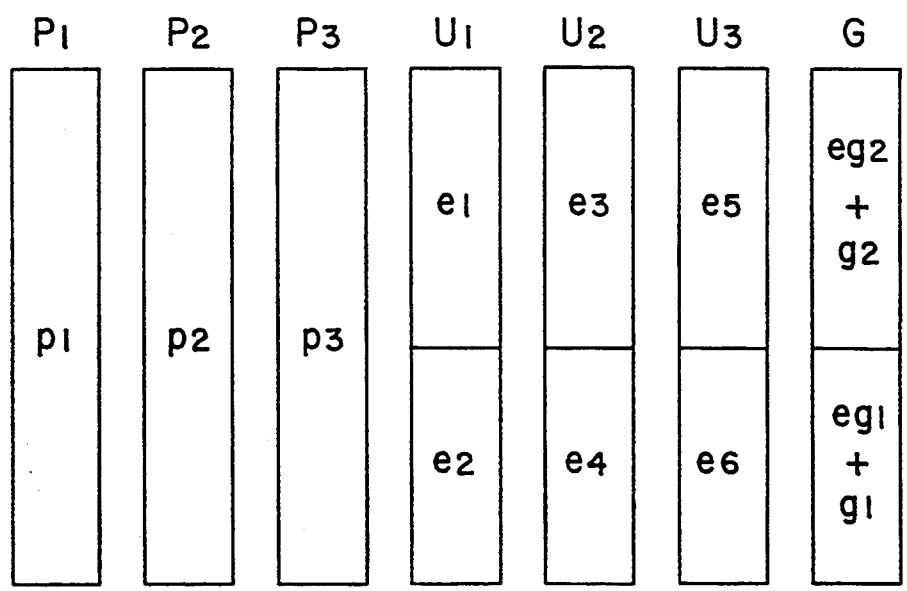
F I G. 2 B

CONTROL ROD SIDE

CONTROL ROD SIDE

FUEL ASSEMBLY FOR THERMAL NEUTRON TYPE REACTOR

BACKGROUND ART

The present invention relates to a fuel assembly adapted for a thermal neutron type reactor and more particularly to a fuel assembly utilizing fuel rods enriched in plutonium.

In view of effective usage of resource and energy security, there is a schedule for the utilization of plutonium recovered through reprocessing of spent fuel as a fuel in a thermal neutron reactor.

The plutonium radiates α-rays having high radiation intensity and it is hence necessary to prevent a human body from being internally exposed and also radiates neutrons and γ-rays through decay and spontaneous fission. For this reason, production or fabrication of the fuel including the plutonium should be performed in a sealed environment in comparison with uranium fuel. In addition, many considerations must be paid for equipment and manufacturing processes. For example, multiple shielding equipment is required and strict attention should be paid for its decontamination and maintenance. Accordingly, it is extremely disadvantageous from economical and other view points to manufacture many kinds of fuel pellets and fuel rods containing the plutonium in different concentrations.

From another view point, since severe conditions are placed on the fuel rods containing the plutonium with respect to the conveyance, measurement control and criticality control, it is desired to reduce the number of fuel rods containing the plutonium by using a large containing ratio of plutonium in one fuel rod.

From the above view points, in a fuel assembly in which plutonium of a predetermined amount obtained through the reprocessing of spent fuel is utilized for a thermal neutron reactor, it is advantageous to substitute fuel rods each having high enrichment, in such a fuel assembly utilizing enriched uranium as shown in FIG. 7, with fuel rods containing the plutonium such as uranium-plutonium mixed-oxide fuel (MOX).

FIG. 7A shows a fuel arrangement in the radial direction and FIG. 7B shows a fuel arrangement in the axial direction. In these figures, reference numeral 1 denotes a channel box, 2 denotes a fuel rod, a symbol Ui (i=1—4) represents a uranium fuel, G is a fuel rod containing a burnable poison and W is a water rod.

In the substitution of the highly enriched uranium fuel rods in the uranium fuel rod assembly with the MOX fuel rods, the enrichment of the fissionable plutonium is experimentally set such that the reactivity characteristics as the plutonium fuel assembly and the peaking factors in the radial and axial directions becomes approximately the same as those of the uranium fuel assembly, but as a result, the following relationship will be established approximately.

Namely, in the case where the fuel rod having enrichment ei of the uranium fuel assembly is substituted with the MOX fuel rod having the enrichment Pi, supposing that the concentration of U-235 of the uranium of the MOX fuel is eB, the following equation (1) will be established.

$$Q = \frac{\sum_{i=1}^{I} P_i}{\sum_{i=1}^{I} (e_i - e_B)} \tag{1}$$

I: Numbers of the fuel rods to be substituted.

In this equation Q becomes 1.2 to 1.5.

In another case where the fuel rod having high enrichment of the uranium fuel assembly is substituted with the MOX fuel rod, there is a case in which blanket portions having low concentration of U-235 are arranged to upper and lower ends of the uranium fuel rod. However, in the MOX fuel rods, there is a possibility of increasing the number of MOX fuel rods when a predetermined amount of the recovered plutonium is treated with the MOX fuel rod by providing the blanket portions having a lower U-235 concentration than natural uranium, thus being disadvantageous from an economical view.

In the thermal neutron reactor, when it is required to mix the plutonium with the uranium fuel and then to cause a fission reaction, nuclides other than U-235 for causing the fission reaction with respect to the thermal neutrons are plutonium isotopes of Pu-239 and Pu-241. The plutonium further includes Pu-240 absorbing the thermal neutrons and minute amount of Pu-238 and Pu-242.

The plutonium isotope Pu-241 is subjected to β-decay with a relatively short half life (14.7 years) and decays to Am-241 as a neutron absorbing nuclide. During the cooling period of the spent fuel, Pu-238 and Pu-240 are transformed by α-decay of Cm-242 and Cm-244, respectively, but the transformed amounts thereof are small and their influence on the characteristics of the MOX fuel will be neglected.

The amount of fissionable isotope of plutonium to be enriched in the MOX fuel rod for a thermal neutron reactor is restricted to the amount necessary for keeping a chain reaction for a predetermined period and only the amount determined by design is mixed. Namely, U-235, Pu-239 and Pu-241 must be mixed so as to take a value designed for achieving a predetermined reactivity.

However, the plutonium is recovered by the reprocessing of the spent fuel and, accordingly, the isotope composition thereof differs in accordance with initial enrichment, burnup degree and cooling period of the spent fuel. FIG. 8 represents one example of the change of plutonium isotope in case of uranium fuel burnup.

Accordingly, the plutonium recovered after reprocessing through mixing of various kinds of spent $O_2$ fuels is considered to have a certain isotopic composition due to reprocessing.

In general, the fuel design is determined so that the enrichment of the fissionable substance of the fuel rod has a predetermined reactivity before the recovery of the plutonium. However, it is complicated and disadvantageous to redesign the enrichment of the fissionable substance every time when the composition of the fissionable nuclide in the actually recovered plutonium differs in order to maintain the predetermined reactivity.

Further, since Am-241 is removed as an impurity at the time of the recovery of the plutonium during the reprocessing of the spent fuel, it is not necessary to consider accumulation thereof during the spent fuel cooling period. However, the Am-241 is accumulated in a period from the recovery of the plutonium to its loading into a core as a manufactured MOX fuel, so that it becomes necessary to design the enrichment in consideration of its influence on the core characteristics.

For the design of the enrichment of the MOX fuel, the use of the mixture of the recovered plutonium is assumed as described above, but the actual mixing ratio and the amount of Pu-241 to be transformed to Am-241 through the $\beta$-decay during the cooling period and a time before its loading into the core after the reprocessing, are not clear. For this reason, in the conventional technology, the design has been made by tentatively assuming the containing rate of the sum Puf of the fissionable plutonium isotope Pu-239 and Pu-241 contained in the recovered plutonium by considering the initial enrichment, burnup degree, cooling period, and reprocessing amount, and the time after reprocessing before loading into the core as a fuel assembly after the transformation to PuO$_2$ and manufacturing as the MOX fuel through mixing with UO$_2$.

That is, at a time when the MOX fuel using the recovered plutonium after the reprocessing of the spent fuel in a boiling water reactor BWR, on the assumption that plutonium would be obtained having a plutonium containing ratio F of from about 80%, which is recovered after reprocessing spent fuel having a low initial enrichment and low burnup degree such as initially loaded fuel, to about 60%, which is recovered after the reprocessing of spent fuel having a high initial enrichment and high burnup degree such as reloaded fuel; the larger containment rate of about 80% is sought. This is because the reactivity becomes high in the case of the high containing rate F, that is, less amount of Pu-240 or Pu-242 as the thermal neutron absorbing nuclide, and accordingly, the margin with respect to the thermally limited value in the operational characteristic at loading in the core of the MOX fuel becomes small. According to the confirmation of the margin in the design on the assumption of such plutonium containing rate F, in the actual plutonium usage, in case the plutonium containing rate F could be made to be larger than the assumed value in the design, the margin with respect to the thermally limited value could be made large.

Further, with respect to the decay of Pu-241 and its daughter of Am-241 which is accumulated during the time from manufacturing the recovered plutonium into the MOX fuel and loading into the core, a shorter arrangement such as about one year has been made in consideration of an actually usable period. This is also based on the consideration that Pu-241 is contained in a higher amount in the less usable period and a higher margin can be ensured in view of its reactivity.

As described above, in the design of the MOX fuel, the enrichment should be set by preliminary assumption of the containing rate F with a certain composition in the initial design in spite of the fact that the composition of the plutonium and, in particular, the containing rate F of fissionable plutonium, to be actually obtained and used are not clear, and accordingly, in the initial design, the containing rate F should be set to a considerably large value with respect to the plutonium to be actually used.

After the MOX fuel has been designed and the margin having an optimum operational characteristic has been confirmed, the plutonium to be actually used is obtained. In a case where the containing rate F of the plutonium obtained is different from that of the assumption at the design time, the mixing amount of the plutonium is regulated so that the amount of fissionable nuclides $^{235}$U+$^{239}$Pu+$^{241}$Pu are to coincide. In this method, however, the reactivity is increased or decreased largely in accordance with the increasing or decreasing of the amounts of Pu-240 and Pu-242. In the case of the amount of PU-240 and Pu-242 being larger than that in the design, less reaction may be caused and power may be hence reduced. From the viewpoint of ensuring the design margin, since safety is maintained in the case of less reaction than in the case of excessive reaction, the design is made as a countermeasure so that such isotopes as Pu-240 have the containing rate less than the assumed plutonium composition and, in the case where the reactivity shortage is actually caused, an amount of fuel to be exchanged is increased or the running period is made short. However, such countermeasures result in the change of the fuel amount to be required or disadvantages in economy.

In the BWR as one example of the thermal neutron reactor, as shown in FIG. 9, a number of fuel assemblies are allocated within a channel box to constitute a core. Referring to FIG. 9, reference numerals 3, 4, 5, 6 and 7 denote a fuel assembly, a local power range monitoring system LPRM, an intermediate power range monitoring system IRM, a source range monitoring system SRM and a control rod, respectively.

In a space between the adjacent fuel assemblies 3, there is located a water gap area, having a constant width, for arranging a cross-shaped control rod, i.e. control blade, or instrumentation tube.

Coolant in the channel box constitutes two layer flows of water and steam during the running of the core, but in the water gap area, the coolant is not directly heated by the fuel rod, thus not generating steam. For this reason, the atomic density of hydrogen in the water gap area is large and the radical distribution of the thermal neutrons in the horizontal cross-section of the fuel assembly 3 of the BWR is made large in the peripheral portion of the fuel assembly. In order to make a power peaking factor small in an inner radial direction of the fuel assembly, it is adapted to arrange fuel rods having low enrichment to the peripheral portions of the fuel assembly as shown in FIGS. 7A and 7B.

In a case where the fuel rods containing plutonium are used, in order to make a power peaking factor small in the radial and axial directions of the fuel assembly, it is necessary to adjust the enrichment and the distribution of the uranium fuel rods and the density and the distribution of a burnable poison as well as their arrangement in the fuel assembly.

In general, the isotope of the plutonium recovered by the reprocessing is different, as described hereinbefore, in initial enrichment, burnup hysteresis, burnup degree, cooling period, etc. of the spent fuel reprocessed. However, when MOX fuel manufactured by mixing such plutonium with uranium is irradiated by thermal neutrons in the thermal neutron reactor, the isotopes of uranium and plutonium are transformed as follows. Namely, neutrons of the uranium fuel are absorbed by U-238 in the thermal neutron reactor and transformed into Pu-239. The Pu-239 is fissioned by the absorption of thermal neutrons, but a portion thereof is transformed into Pu-240, which is then transformed into Pu-241 by the absorption of neutrons. The Pu-241 is a fissionable nuclide, but a portion thereof is further transformed into Pu-242 by further absorption of neutrons. The Pu-241 is then transformed into Cm-242 by the absorption of neutrons. As a consequence of such reactions of the plutonium isotopes, the fissionable substance contained in the fuel rod is less reduced by the fission and the lowering of the reactivity does not progress due to the burnup of the fuel in comparison with the uranium fuel. Therefore, the power peaking of the fuel rod containing the plutonium in the radial direction of the fuel assembly has a tendency of being made large during the burnup in comparison with the fuel rod containing the uranium.

Further, since the composition of the plutonium isotope recovered after the reprocessing cannot be specified, it is necessary to either not utilize the rod in a case where the composition of the plutonium actually obtained includes a larger amount than the Puf amount assumed in the design, or to mix the recovered plutonium with other plutonium containing a lesser amount of Puf. In a conventional technique, there is no clear standard for judgement with respect to a mixing ratio and compositions in such mixing of the plutonium isotopes, and accordingly, such mixing has been performed case by case on the basis of experimental results.

As described above, in the conventional technology, when plutonium is mixed, there is no clear standard for judgement as to the mixing ratio and the composition to be obtained, so that the reactivity of the MOX fuel manufactured using the plutonium depends largely on the composition of the obtained plutonium, and the scattering of the reactivity is observed from a view point of interchangeability with the uranium, thus including disadvantageous points relating to the limit of the power peaking in core operation and in fuel economy.

The present invention was conceived in view of the above defects and disadvantages and aims to provide a fuel assembly for a thermal neutron type reactor capable of reducing the kind and number of fuel rods containing plutonium and increasing the margin with respect to the thermal limit during the running of the reactor.

Another object of the present invention is to provide a fuel assembly for a thermal neutron type reactor capable of easily setting the fission reaction effects of the fuel containing the plutonium and easily performing correction for maintaining its characteristics.

A further object of the present invention is to provide a fuel assembly for a thermal neutron reactor capable of preventing an excessive increase of power peaking factor in the radial and axial directions of the fuel assembly containing the plutonium.

DISCLOSURE OF THE INVENTION

The first embodiment of this invention, for achieving the above objects, is characterized in that a portion or the whole of the fuel rods of a fuel assembly for a thermal neutron type reactor in which fuel rods utilizing enriched uranium are bundled in lattice arrangement is substituted with fuel rods containing plutonium and the fuel rods containing the plutonium are provided with no uranium fuel portion and no uranium blanket portion.

The second embodiment of this invention, for achieving the above objects, provides a fuel assembly for a thermal neutron reactor in which fuel rods utilizing enriched uranium are bundled in lattice arrangement, which is characterized in that a portion of the fuel rods in the lattice arrangement is substituted with fuel rods containing plutonium, concentrations of the plutonium are set in accordance with the containing rate of Pu-240, an isotope of the plutonium, and with respect to plutonium having a composition of different plutonium isotopes, predetermined concentrations are obtained by deciding a mixing ratio in accordance with the difference in the amount of Pu-240 to thereby obtain a predetermined plutonium isotope composition.

The third embodiment of this invention, for achieving the above objects, provides a thermal neutron type reactor in which fuel rods utilizing enriched uranium are bundled in lattice arrangement, which is characterized in that a portion or the whole of the fuel rods in the lattice arrangement is substituted with fuel rods containing plutonium, concentrations of the plutonium are set in accordance with the containing rate of Pu-240, an isotope of the plutonium, and with respect to plutonium having a composition of different plutonium isotope, predetermined concentrations are obtained by deciding a mixing ratio in accordance with the difference in the amount of Pu-240 to thereby obtain a predetermined plutonium isotope composition.

The fourth embodiment of this invention, for achieving the above objects, provides a fuel assembly for a thermal neutron type reactor in which fuel rods utilizing enriched uranium are bundled in lattice arrangement, which is characterized in that a portion of the fuel rods in the lattice arrangement is substituted with fuel rods containing plutonium and concentration of the plutonium are corrected in accordance with the composition of the plutonium, cooling period of spent fuel and period until the time of mixing the plutonium with the uranium to manufacture the fuel and loading into a core after reprocessing treatment.

The fifth embodiment of this invention, for achieving the above objects, provides a thermal neutron type reactor in which fuel rods utilizing enriched uranium are bundled in lattice arrangement, which is characterized in that a portion of the fuel rods in the lattice arrangement is substituted with fuel rods containing plutonium and the concentration Pi of the plutonium is set by the following equation including an concentrations ei of the uranium fuel $$Pi = (ei - eB) \cdot Q$$

$$Q \leq 1.2$$

eB: U-235 concentration contained in uranium of a fuel mixed with plutonium

According to the fuel assembly for a thermal neutron type reactor of the first embodiment, the uranium fuel portion and the uranium blanket portion are not provided. For this arrangement, the plutonium amount contained in one fuel rod increases and the number of the fuel rods manufactured from a predetermined amount of plutonium can be reduced. Furthermore, the effective heat generation length of the fuel rod containing plutonium is made long and the maximum linear power density is lowered, whereby the margin with respect to the thermal limit value during running core can be increased.

Further, according to the fuel assembly for a thermal neutron type reactor of the second embodiment, the concentration of the plutonium of the fuel rod containing the plutonium is set in accordance with the containing rate of Pu-240. The relationship between the sum Puf (Puf = $^{239}$Pu + $^{241}$Pu) of the fissionable nuclides in plutonium isotopes immediately after the irradiation of spent fuel and the Pu-240 is represented by a simple descending curve which is substantially not dependent on the spent fuel and its burnup degree. For this reason, by utilizing this simple descending relation, the reactivity change caused by the difference in the plutonium isotope composition can be easily and reasonably compensated for.

Furthermore, according to the fuel assembly for a thermal neutron type reactor of the third embodiment, with respect to the plutonium having the different isotope composition, the mixing ratio is decided in accordance with the difference of the Pu-240 amount to thereby obtain the predetermined plutonium isotope composition. Accordingly, even in a case where the amount of Pu-240 assumed at the design time differs from the amount of the actually obtained Pu-240, the concentration correction can be done by making the simple descending curve approximate a straight line.

Still furthermore, according to the fuel assembly for a thermal neutron type reactor of the fourth embodiment, the concentration of the fuel rod containing the plutonium is corrected in accordance with the composition of the plutonium, the cooling period of the spent fuel and the period until the time of mixing the plutonium and the uranium, MOX fuel manufacturing and then loading it into the core, thus being capable of accurately setting the concentration.

According to the fuel assembly for a thermal neutron reactor of the fifth embodiment, the concentration of the plutonium of the fuel rod containing the plutonium is set by the relationship of a predetermined equation substantially including the enrichment of the uranium fuel. For this reason, the power peaking factor of the fuel rod containing the plutonium can be lowered relatively to that of the uranium fuel rod.

BRIEF DESCRIPTION OF THE DRAWINGS

FIG. 2A is a view corresponding to that of FIG. 1A, but related to the second embodiment of the present invention, FIG. 2B is a view corresponding to that of FIG. 1B, but related to the second embodiment.

BEST MODES FOR CARRYING OUT THE INVENTION

Hereinbelow, a first embodiment of the present invention will be described with reference to the accompanying drawings.

Figure 1A:
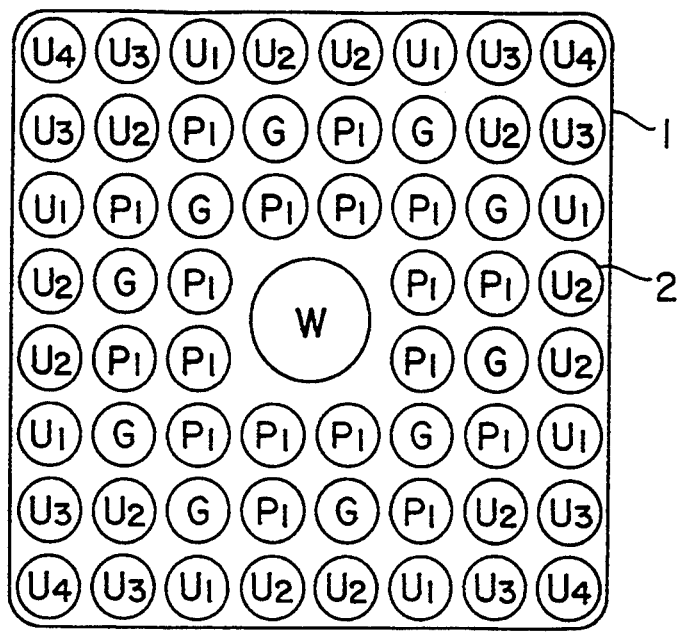
FIG. 1A shows a fuel arrangement in a radial direction of a fuel assembly for a thermal neutron type reactor according to the first embodiment of the present invention.
Figure 1B:
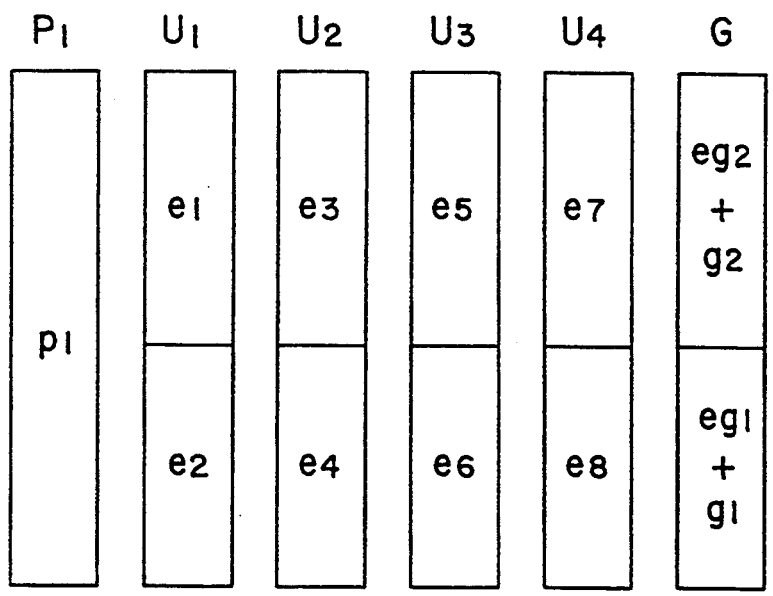
FIG. 1B shows an arrangement in the axial direction thereof.

FIGS. 1A and 1B represent an MOX fuel assembly for a BWR as one example of a fuel assembly for a thermal neutron type reactor according to the present invention, in which FIG. 1A shows a fuel arrangement in the radial direction of the fuel assembly and FIG. 1B shows a fuel arrangement in the axial direction thereof.

In FIGS. 1A and 1B, reference numeral 1 denotes a channel box and 2 is a fuel rod, and a symbol Ui (i=1—4) denotes uranium fuel, P1 is an MOX fuel containing plutonium, G is a fuel rod containing a burnable poison and W is a water rod.

Figure 7A:
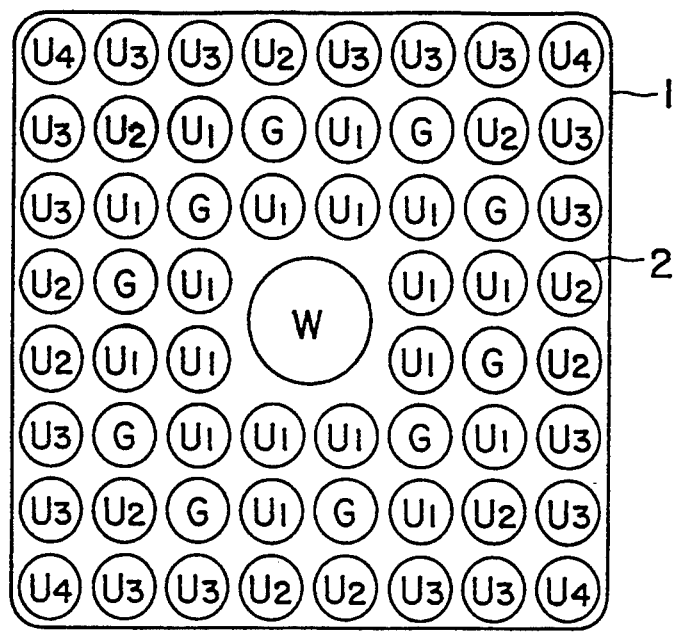
FIG. 7A shows a fuel arrangement in a radial direction of a conventional fuel assembly for a thermal neutron type reactor.
Figure 7B:
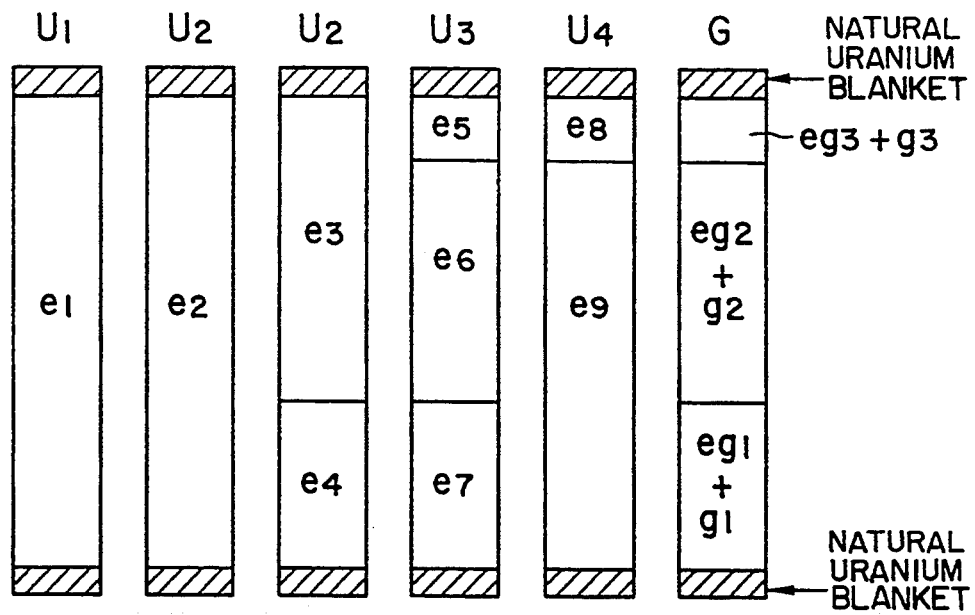
FIG. 7B shows an arrangement in the axial direction thereof.
Figure 8:
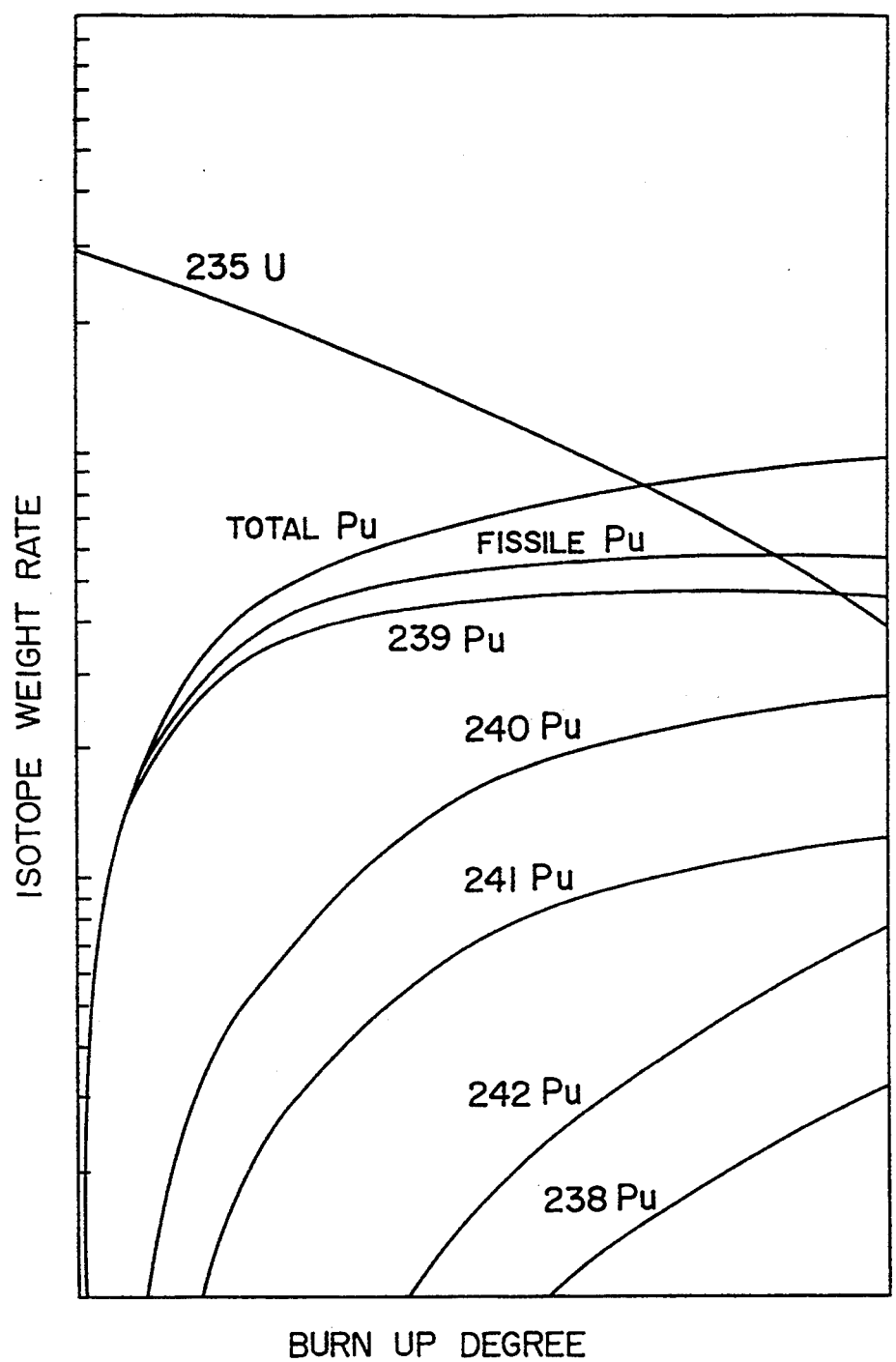
FIG. 8 is a graph showing one example of the plutonium composition.
Figure 9:
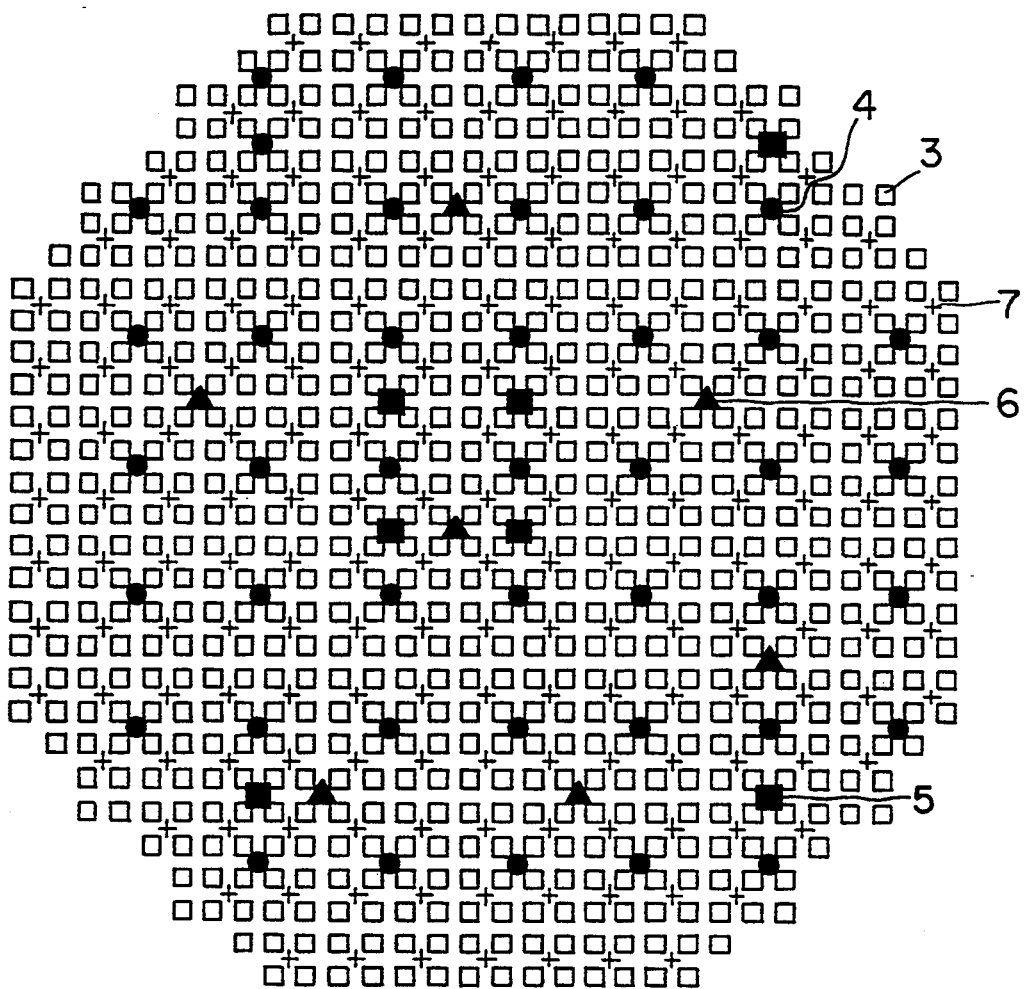
FIG. 9 shows an arrangement of a fuel assembly and a control rod in a conventional BWR core.

In the present embodiment, the fuel assembly has a structure in which the eighteen highly enriched fuel rods disposed at the central portion of a conventional uranium fuel assembly such as shown in FIGS. 7A and 7B are substituted with MOX fuel rods.

Further, the concentrations of the fissionable plutonium (Pu), the U-235 enrichments of and the poison density of the fuel rod are, as follows.

Concentration of Fissionable Pu
P1: 4.5%

Enrichment of U-235
e1: 4.0%
e2: 3.0%
e3: 3.8%
e4: 2.8%
e5: 3.5%
e6: 2.3%
e7: 2.6%
e8: 1.8%

Enrichment of U-235 of Fuel Rod Containing Burnable Poison
eg1: 4.1%
eg2: 4.9%

Poison Density of Fuel Rod Containing Burnable Poison
g1: 3.5%
g2: 4.5%

Each of these eighteen MOX fuel rods has a structure corresponding to that of FIGS. 7A and 7B in which the uranium fuel rods having an enrichment higher than that of fuel rods disposed to the peripheral portion of the fuel assembly are substituted with the MOX fuel rods. The concentration of the plutonium is made high by substituting the fuel rods disposed to the peripheral portion with the MOX fuel rods, and accordingly, the numbers of fuel pellets and fuel rods can be reduced at a time of fabricating a predetermined amount of the recovered plutonium to the MOX fuel.

FIGS. 2A and 2B represent a second embodiment of the present invention, in which forty fuel rods having high enrichment disposed at the central portion of the uranium fuel assembly and a part of the peripheral portion thereof are substituted with the MOX fuel rods. In FIGS. 2A and 2B, a symbol Uj (j=1—3) denotes a uranium fuel rod and Pi (i=1—3) is an MOX fuel rod containing plutonium. The concentrations of the plutonium and the enrichments of uranium U-235 are as follows.

Concentration of Fissionable Pu
P1: 6.2%
P2: 5.0%
P3: 3.6%
Enrichment of U-235
e1: 4.0%
e2: 3.0%
e3: 3.3%
e4: 2.3%
e5: 2.2%
e6: 1.8%
Enrichment of U-235 of Fuel Rod Containing Burnable Poison
eg1: 4.1%
eg2: 4.9%
Poison Density of Fuel Rod Containing Burnable Poison
g1: 1.5%
g2: 2.5%

In the present embodiment, twenty uranium fuel rods not substituted with the MOX fuel rods have low enrichment less than half of the enrichement of the centrally arranged fuel rods. For this arrangement, the amount of the MOX fuel rods to be manufactured having low plutonium concentration is reduced by substituting the fuel rods disposed to these portions with the uranium fuel rods, and accordingly, the number of MOX fuel rods manufactured from the predetermined amount of the recovered plutonium can be effectively reduced.

Figure 3A:
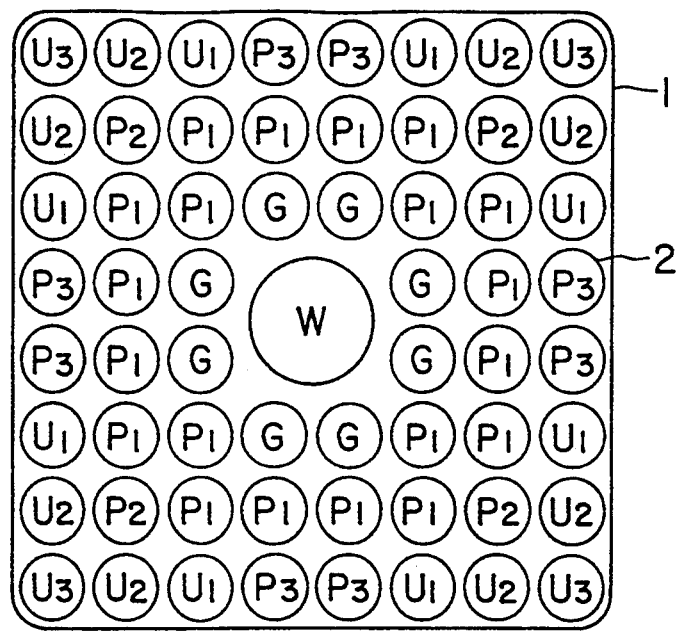
FIG. 3A is a view corresponding to that of FIG. 1A, but related to the third embodiment of the present invention.
Figure 3B:
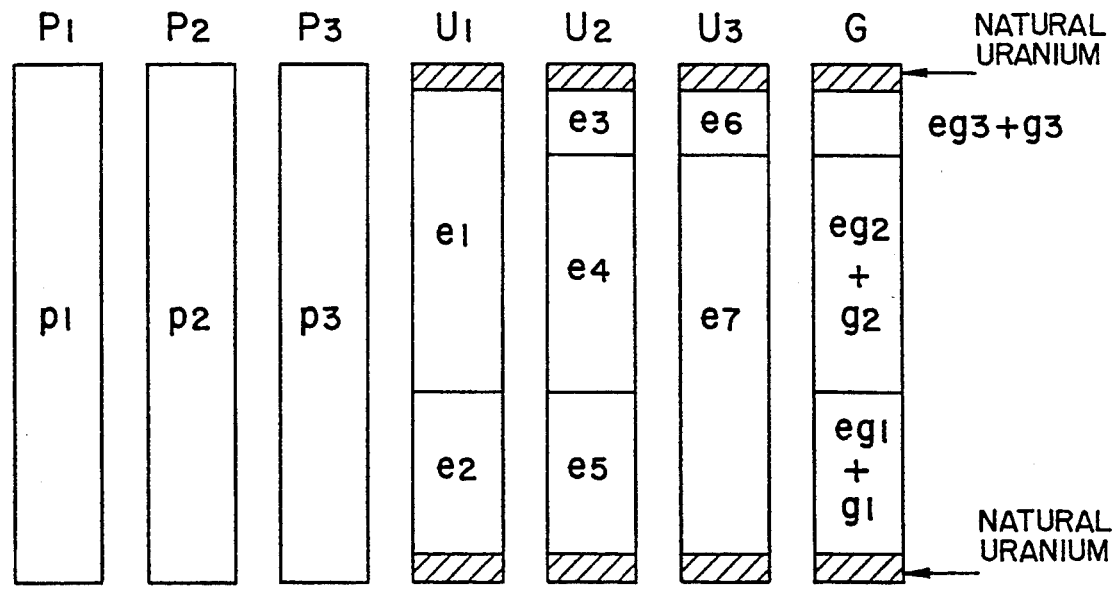
FIG. 3B is a view corresponding to that of FIG. 1B, but related to the third embodiment of the present invention.

FIGS. 3A and 3B represent a third embodiment of the present invention, in which MOX fuel rods each having no natural uranium blanket portion at its upper and lower ends. The concentrations of the plutonium and the enrichments of uranium-235 are as follows.

Concentration of Fissionable Pu
P1: 6.2%
P2: 5.0%
P3: 3.6%
Enrichment of U-235
e1: 4.2%
e2: 3.9%
e3: 3.4%
e4: 3.9%
e5: 3.4%
e6: 2.5%
e7: 3.4%
Enrichment of U-235 of Fuel Rod Containing Burnable Poison
eg1: 2.8%
eg2: 3.0%
eg3: 2.8%
Poison Density of Fuel Rod Containing Burnable Poison
g1: 3.5%
g2: 4.5%
g3: 2.5%

In the present embodiment, the natural uranium blanket portion is not provided for the MOX fuel rod, so that the number of the MOX fuel rods manufactured from the predetermined amount of recovered plutonium can be prevented from increasing. Furthermore, since the blanket portion is constructed to be an effective portion for heat generation as fuel portion, the maximum linear power density can be lowered and the margin to the thermal limit during core running period can thus be increased.

Figure 4:
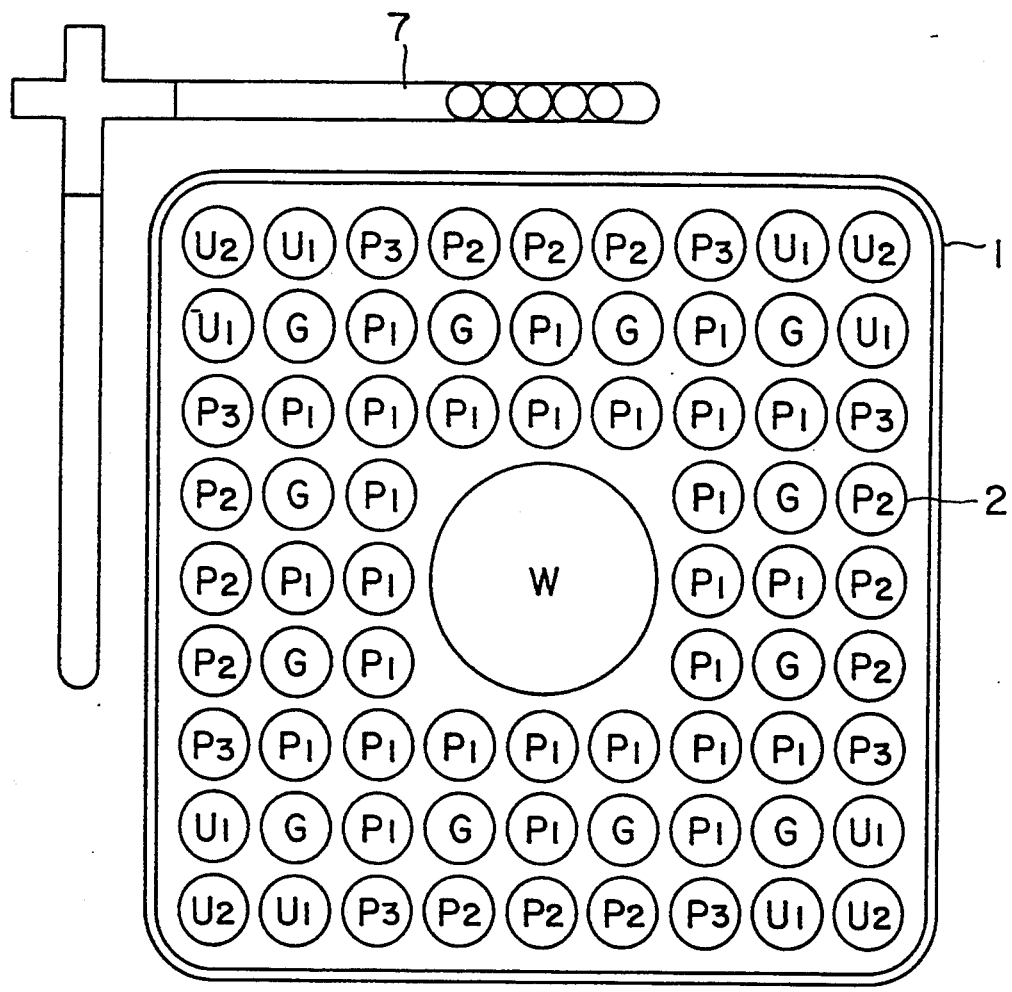
FIG. 4 is a view corresponding to that of FIG. 1A, but related to the fourth embodiment of the present invention.

FIG. 4 represents a fourth embodiment of the present invention adapted for a fuel assembly including fuel rods in 9-row and 9-line arrangement (9×9 fuels).

In this embodiment, the concentrations of the plutonium and the enrichments of uranium-235 are as follows.

Concentration of Fissionable Pu
P1: 6.2%
P2: 5.0%
P3: 3.6%
Enrichment of U-235
U1: 3.5%
U2: 2.8%
U3: 2.0%
Enrichment of U-235 of Fuel Rod Containing Burnable Poison
upper portion: 4.9%
lower portion: 4.1%
eg3: 2.8%
Poison Density of Fuel Rod Containing Burnable Poison
upper portion: 2.5%
lower portion: 1.5%

In the above respective embodiments, the transformation of the composition of the plutonium isotope during the irradiation in a thermal reactor is mainly carried out through the following chain reaction by the absorption of neutrons.

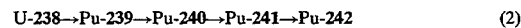

$$\text{U-238} \rightarrow \text{Pu-239} \rightarrow \text{Pu-240} \rightarrow \text{Pu-241} \rightarrow \text{Pu-242} \tag{2}$$

A portion of each of Pu-239 and Pu-241 is burned up through the fission.

A following equation shows a sum of the fissionable nuclides in the plutonium isotope immediately after the irradiation of the spent fuel.

$$Puf = {}^{239}Pu + {}^{241}Pu \tag{3}$$

Figure 5:
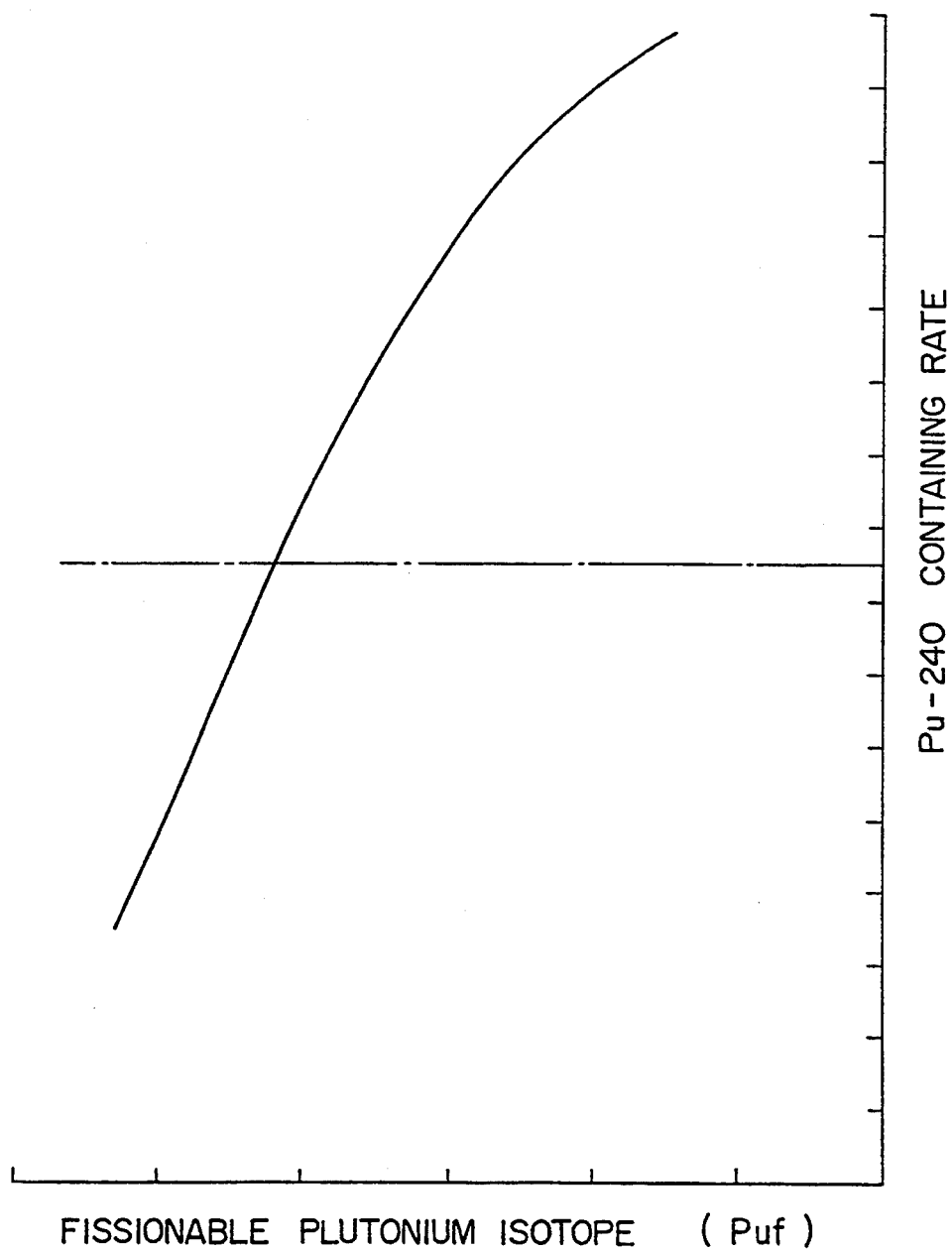
FIG. 5 is a graph showing a relationship of the plutonium isotope Pu-240 and the sum of the fissionable plutonium isotope.

The relationship between Puf and Pu-240 is represented in FIG. 5.

That is, the relationship between the Pu-240 and the Puf is represented by a simple descending curve substantially not dependent on the spent fuel and its burnup degree. Accordingly, the composition of the plutonium isotope after the mixing can be obtained by the amount of the Pu-240 and the mixing ratio even if the plutonium has a different composition due to the reprocessing batch by applying this simple descending curve to an approximation of a straight line.

According to the present invention, the setting of the composition of the recovered plutonium after the mixing can be easily and reasonably made by utilizing the simple descending relationship between the Pu-240 and the Puf.

In a case where the composition of the recovered plutonium isotope is different from the composition tentatively assumed at the time of MOX fuel design, the reactivity change caused by the difference of the plutonium isotope composition of the MOX fuel can be easily and reasonably compensated for by utilizing that simple descending relationship.

Now, supposing that the simple descending curve of Puf at the containing ratio of Pu-240 of the isotopic composition of the recovered plutonium set at the stage of MOX fuel design crosses with a straight line having the same inclination as that of a tangential line on that simple descending curve at points fA and fB as shown in FIG. 6, in which, the intersections fA and fB of the curve and the straight line are set so that the Pu-240 containing ratio A for one plutonium batch obtained by reprocessing spent fuel and the Pu-240 containing ratio B for another plutonium batch obtained by reprocessing other spent $UO_2$ fuels, respectively. Pu-240 of the mixture of the plutonium A and the plutonium B has a point C in FIG. 6 at which the weighted average is made with the respective weights, and the Puf is positioned on a point fC', corresponding to the point C, on the line connecting the points fA and fB. Accordingly, by mixing the plutonium so that the amount C of the Pu-240 coincides with the amount D of the Pu-240 of the composition of the plutonium isotope assumed at the MOX fuel assembly design time, the amount fC' of the Puf at that time is only slightly lower than the amount fd assumed at the design time, and hence, characteristics in reactivity of the MOX fuel assembly are substantially not changed from evaluation at the design time or, even if changed only a slight increase of the operational margin will be caused.

Figure 6A:
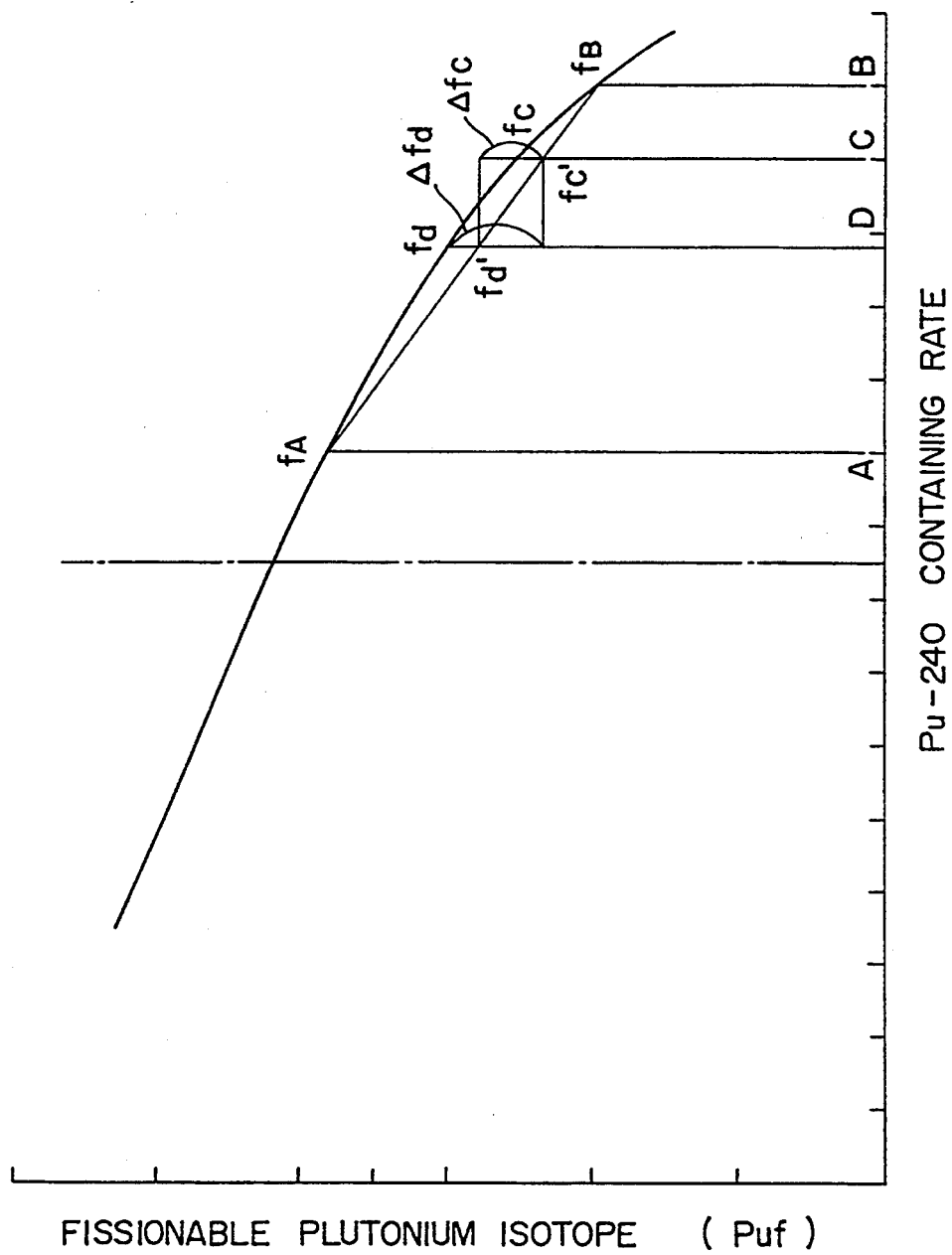
FIGS. 6A and 6B are explanatory views for showing a method of obtaining composition of the plutonium mixed in accordance with the graph of FIG. 5.

Further, at the time of the MOX fuel assembly design, there is a tendency of often setting the amount of Puf to a relatively smaller value from the reason that the composition of the plutonium isotope actually recovered is not clear. In such case, the amount C of Pu-240 of the actually obtained plutonium becomes larger than the amount D of Pu-240 tentatively set at the design time, and accordingly, the characteristics in the reactivity of the MOX fuel assembly become smaller than that of the design time by an amount corresponding to Δfd as shown in FIG. 6A. This is disadvantageous for the reactivity characteristics of the MOX fuel assembly. In order to make equivalent in the reactivity the plutonium of such composition to the MOX fuel utilizing the plutonium having the composition at the design time, the design value of the concentrations of the plutonium of the MOX fuel will be corrected to make the same high, whereby the amount of the MOX fuel to be manufactured can be reduced, thus being advantageous in fuel economy.

Furthermore, according to the present invention, the reactivity change due to the difference between the amount of Pu-240 actually obtained and the amount of Pu-240 assumed at the design time can be compensated for by a reasonable method.

That is, now supposing that the Pu-240 amount of the obtained plutonium, with respect to the concentrations Pi of the MOX fuel rod, is the value of C in spite of the design with the Pu-240 amount of D of the composition of the plutonium isotope. In such case, the amount of the Puf is less by the amount of fd−fc=Δfd, and an amount larger by C−D of Pu-240 being the neutron absorbing nuclide from the assumed amount D at the design time is mixed with the MOX fuel rod having the concentration Pi. However, according to the present invention, in which the concentration Pi could be corrected as shown in the following equation in accordance with the difference of the Pu-240 amounts by making approximate, to the straight line as described hereinbefore, the fissionable substance of the composition of the plutonium isotope with the amounts of C and D of Pu-240. That is, the correction amount is expressed as, by using the symbols in FIG. 6A, $$\{(fA-fB)/(A-B)\cdot(D-C)+fC\}\times Pi/fC = fd'/fC \times Pi \quad (4)$$

Thus, the enrichement Pi is multiplied by fd'/fC' times.

Figure 6B:
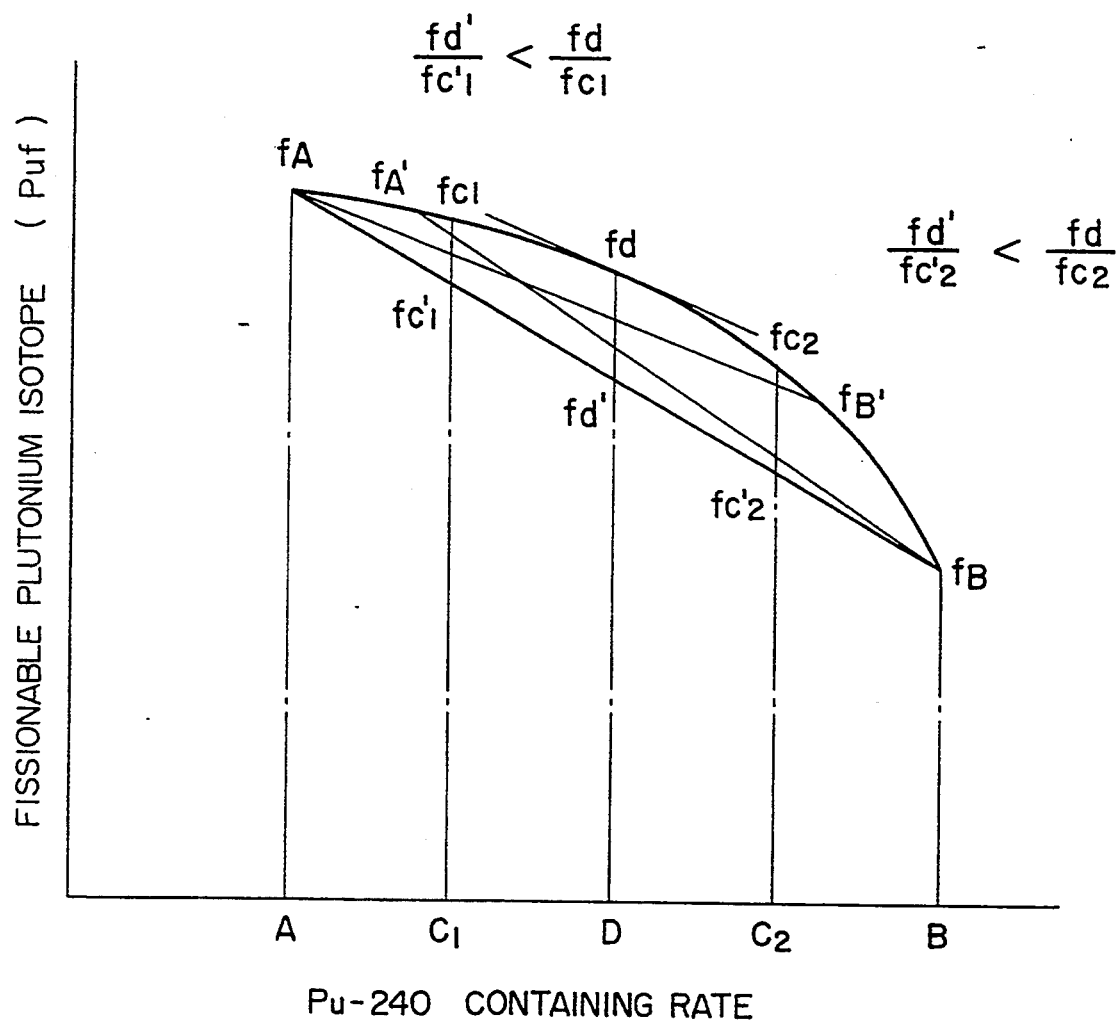

According to this correction, the Puf ratio of the actually obtained plutonium becomes fC+ΔfC'=fd' slightly smaller than the Puf ratio of the plutonium at the design time. Therefore, the Puf ratio becomes substantially equivalent to that at the design time in the view point of the reactivity, and in the view point of the operational margin, the margin does not unnecessarily increase, thus providing a reasonable correction amount according to the present invention. Further, in a case where the Pu-240 amount of the obtained plutonium differs from that of the plutonium set at the design time, the inclination of the above-mentioned straight line can be made as shown in FIG. 6B in a manner such that the inclination has a range more than an inclination of the tangential line to the above-mentioned curve when the Pu-240 containing ratio of the recovered plutonium is less than that set tentatively at the design time and that the inclination has a value less than that of the inclination of the tangential line when the Pu-240 containing ratio of the recovered plutonium is larger than that set tentatively at the design time.

Namely, when the Pu-240 of the obtained plutonium is C1 which is smaller than the Pu-240 containing ratio D set tentatively at the design time, the fC'1 at the value of C1 of the line fA'-fB having an inclination less than the inclination of the above-mentioned tangential line at the point fd and the fd' at the value of D have relationship of fd'/fc'1≦fd/fC1. Accordingly, the correction amount can be made small and hence an excessive correction will be avoided by multiplying the Pi by fd'/fC'1 times other than fd/fc1 times. In a case where the containing ratio of the Pu-240 of the obtained plutonium has a value C2 which is larger than the value D, fC'2 at the ratio C2 and fd' at the ratio D of a line fA-fB' having an inclination not exceeding the inclination of the tangential line at fd has a relationship of fd'/fC'2≦fd/fC2, an excessive correction can be obviated by multiplying the Pi by fd'/fC'2 times other than fd'/fc'2 times.

Further, supposing that the amount of Pu-241 at a time just after discharge of the spent fuel is $^{241}$Pto, the amount of Pu-241 and the $^{241}$Pto+Δt at the cooling period of (to+Δt) are expressed as follows.

$$^{241}Pto+\Delta t = {}^{241}Pto(1-e^{-\lambda \Delta t}) \quad (5)$$

$\lambda = 0.693/T1/2$  T1/2: half life (14.7 year)

According to the present invention, the reduction of the Pu amount from the above equation forms a method of correcting the reactivity loss due to Pu-241 decay, thereby easily setting the reactivity effects of the MOX fuel by reasonably carrying out the plutonium concentration design of the MOX fuel.

Namely, for the relation of the Puf with respect to the aforementioned Pu-240, the simple descending curve is established in no consideration of the cooling period, so that, when the concentration of the plutonium in MOX fuel is to be set, the concentration of plutonium can be made high so as to compensate for the reduced amount during the cooling period of the Pu-241 amount from the fissionable Pu ratio Cf of the obtained plutonium in view of the above relation.

Further, in a case where the recovered plutonium after the reprocessing is treated with an oxide, the Am-241 produced through the β-decay of the Pu-241 is accumulated. The Am-241 absorbs neutrons and a portion thereof is transformed to fissionable Am-242, so that the reactivity is recovered to some extent during the irradiation by thermal neutron in the thermal reactor.

An amount Atl of the Am-241 at Δtl after the reprocessing will be expressed as follows on the assumption of the Pu-241 amount after the reprocessing to $^{241}$Pu (t1=0).

$$At1 = {}^{241}Pu(t1=0) \cdot (1 - e^{-\lambda \Delta tl}) \qquad (6)$$

According to the present invention, as a method of correcting the reactivity loss due to the accumulation of the Am-241, an accumulated amount of Am-241 is calculated from the above equation and the setting of the concentration of the MOX fuel can be reasonably performed. Namely, at the setting of the concentration of the MOX fuel, the accumulated amount of the Am-241 is assumed from the above equation with respect to a period between the assumed manufacturing to the MOX fuel and the loading into the core, to thereby make the plutonium concentration high so as to correct the reactivity loss effect.

Furthermore, in a fuel assembly in which a conventional enriched uranium is used, when a portion of the fuel rods using the enriched uranium is substituted with the MOX fuel rods, the following procedure will be carried out at the setting time of the plutonium concentration of the MOX fuel rods in order to prevent the excessive increasing of the power peaking factor in the radial and axial directions of the MOX fuel assembly caused by the difference with respect to the reduction amount of the fissionable substance in the uranium fuel rod due to the production of the fissionable substance due to the nuclear transformation during the irradiation of the plutonium in the MOX fuel rod.

That is, in the conventional technology, as mentioned above, when the uranium fuel rods having the enrichment ei are substituted with the MOX fuel rods, the concentration P1 of the fissionable substance was expressed as follows.

$$Pi = \sum_{i=1}^{I} Pi = \sum_{i=1}^{I} (ei - eB) \times Q \qquad (7)$$

$$(Q = 1, 2 - 1, 5)$$

However, according to the present invention, the power peaking factor of the MOX fuel rod in the MOX fuel assembly can be relatively lowered with respect to that of the uranium fuel rod. In the above equation, symbol eB represents a density of U-235 in the MOX fuel rod and I represents the number of the fuel rods.

Still furthermore, according to the present invention, in order to prevent the excessive increasing of the axial power peaking factor of the MOX fuel assembly, provision is made in related to the enrichment distribution or the density distribution of the burnable poison in the axial direction of the uranium fuel rod or fuel rod containing the burnable poison in the MOX fuel assembly.

Namely, in the conventional uranium fuel assembly, the enrichment distributions in the axial direction are provided for a number of fuel rods. Accordingly, if these fuel rods are substituted with the MOX fuel rods, the arrangement of the enrichment distributions of the fissionable plutonium, results in increasing the kinds of MOX fuels. However, the enrichment distribution or the density distribution of the uranium fuel-rods or fuel rods containing the burnable poison, which are not substituted with the MOX fuel rods, are arranged to thereby constitute the MOX fuel assembly and the excessive increasing of a power peaking factor in the axial direction can be prevented.

Further, in the above-mentioned fuel assembly, a MOX fuel manufacturing line can be reduced by using uranium fuel without plutonium, thus reducing the manufacturing cost.

Furthermore, according to the present invention, fuel containing plutonium and fuel containing no plutonium can be commonly used as the fuel rods containing the burnable poison. In the view point of reducing the manufacturing cost of the plutonium fuel, it is advantageous to use the uranium fuel as the base. Thus, the plutonium loading amount is reduced per one fuel assembly, and accordingly, in a case where a large loading amount of the plutonium is heavily weighed, the burnable poison will be mixed into the fuel containing the plutonium.

The present invention achieves the axial distribution of the fissionable substance (enrichment) or burnable poison amount for the fuel of the BWR by the providing of the fuel rods containing plutonium and the uranium fuel rods containing the burnable poison.

Hereinbelow, the enrichment of the plutonium of the MOX fuel will be described.

Since a containing ratio F of a fissionable isotope Puf of plutonium is not clear at the design time of the MOX fuel assembly, there is an assumed plutonium recovered by reprocessing uranium fuel having a relatively low initial enrichment and a small discharge burnup degree, in which the ratios of the respective Pu-239, Pu-240 and Pu-241 with respect to the entire plutonium are 67%, 22% and 9%, that is, F=76(%), are assumed. Although term Δtc from the uranium fuel discharged time to the reprocessing time and term Δtl from the reprocessing time and the manufacturing time are also not clear, these terms are assumed as Δtc=2 (year) and Δtl=1 (year) from the examples of past experience. As described above, these distributions including uranium and the plutonium in the present invention are designed to satisfy the thermal limit on operational characteristics at the core loading time.

An embodiment of the present invention at a time when the plutonium is actually obtained after the completion of the above design will be explained hereunder.

The actually recovered plutoniums includes plutonium reprocessed by reprocessing an initially discharged uranium fuel after the cooling period of 4 years therefrom and having the composition of isotope immediately after its discharge thereof in which the ratios of Pu-239, Pu-240 and Pu-241 with respect to the entire plutoniums are 71%, 20% and 9%, respectively, and includes plutonium reprocessed by reprocessing a substituted uranium fuel after the cooling period of 4 years therefrom and having the composition of isotope immediately after the discharge thereof in which the ratios of Pu-239, Pu-240 and Pu-241 with respect to the entire plutonium are 47%, 30% and 13%, respectively. The rate in amounts thereof is determined to be 1:2. As this result, the average Puf is calculated as follows.

$$\frac{80 \times 1 + 60 \times 2}{3} \simeq 67 \, (\%) \qquad (8)$$

In use of such plutonium, when the present invention is applied to the correction of the enrichment of the MOX fuel of the present embodiment, the following correction will have to be adapted as shown in FIG. 6A.

$$\left\{\frac{80-60}{20-30}(22-26)+67\right\}\times\frac{Pi}{67}=\frac{75}{67}Pi \doteq 1.1\times Pi \quad (9)$$

Namely, in order to manufacture each of the MOX fuel shown in FIGS. 1 to 4 with the actually obtained plutonium as the fuel maintaining the characteristics at the design time, it is necessary to make the enrichment Pi of the fissionable plutonium to a value 1.1 times of the enrichment concentrations shown in each of the embodiments.

Further, in the above embodiment, there is described a case where the ratio of the obtained plutonium is given, but according to the present invention, the mixing ratio for obtaining the plutonium of F=76% as shown in the embodiment can be easily obtained. That is, supposing that the mixing ratio of the above two kinds of plutonium is Px, the value of the Px is as follows.

$$80Px + 60(1-Px) = 76, Px = \frac{4}{5} \quad (10)$$

Next, in the design of the embodiment, $\Delta tc=2$ (year) and $\Delta tl=1$ (year) are supposed, but with respect to spent fuel due to the actually obtained plutonium, it is supposed that $\Delta tc=4$ (year) and the time until loading into the core after reprocessing is $\Delta tl=2$ (year). Pu-241 at the core loading time at the design time is about 10.0% reduced by the amount of 1.7% from 11.7% at the time of $\Delta tc=0$, but in practice, the Pu-241 is reduced by the amount expressed by the following equation.

$$^{241}Pu(tc=0)e^{-\lambda H} = e\frac{-0.693\times 6}{T1/2} = 0.72\times{}^{241}Pu(tc=0) \quad (11)$$

Accordingly, since the actually obtained plutonium includes Pu-241 reduced by about 3% in amount in comparison with the fissionable plutonium shown in the embodiment, the value F is reduced to 64%, and for this reason, it is necessary to correct the Pi by 1.05 times.

Next, in the embodiment, 1 year is assumed for the term $\Delta tl$ until loading into core after the reprocessing, but a modified embodiment corrected by the present invention in consideration of the fact that this term becomes 2 years due to the actual MOX fuel manufacturing time. In the embodiment, the design is made in consideration of the accumulation of Am-241 due to $\Delta tl=1$ (year), but the Am-241 at this time is expressed by the following equation, in which Pu-241 is shown as $^{241}$Pu (ti=0).

$$^{241}Pu(t1=0)\cdot\left(1-e\frac{-1\times 0.693}{T1/2}\right) \quad (12)$$

In the case after $\Delta tl=2$ (year), Am-241 is increased by, $$^{241}Pu(t1=0)\left(e\frac{-1\times 0.693}{T1/2} - e\frac{-2\times 0.693}{T1/2}\right) \quad (13)$$

Now, supposing qm ($\Delta k/k/\text{Am-241}$) representing the reactivity effect at unit amount of Am-241, the reactivity reduction amount is expressed as, $$qm\cdot{}^{241}Pu(t1=0)\left(e\frac{-1\times 0.693}{T1/2} - e\frac{-2\times 0.693}{T1/2}\right) \quad (14)$$

Then, supposing qn ($\Delta k/k/\text{Puf}$) representing the reactivity effect at unit amount of Puf, the Puf will be increased by the following amount.

$$fAm = \frac{qm\cdot{}^{241}Pu(t1=0)\cdot\left(e\frac{-1\times 0.693}{T1/2} - e\frac{-2\times 0.693}{T1/2}\right)}{qn} \quad (15)$$
$$= 0.042\cdot\frac{qm}{qn}\cdot{}^{241}Pu(t1=0)$$

As described hereinbefore, the concentration Pi of the fissionable plutonium at the design time is expressed as, $$1.1\times 1.05\times fAm\times Pi \quad (16)$$

in consideration of the composition of the actually obtained plutonium, the cooling period of spent fuel and the difference between the term until loading into core after the reprocessing and the assumed term at the design time.

INDUSTRIAL APPLICABILITY

As described hereinbefore according to the first embodiment of this invention, since the fuel rods containing plutonium are not provided with uranium fuel portion and uranium blanket portion, the number of the fuel rods manufactured from a predetermined amount of the plutonium can be reduced and the effective heat generating length of the fuel rod containing the plutonium can be made long, thereby increasing the thermal margin to the thermal limit value at the reactor running time due to the lowering of the maximum linear power density.

Further, according to the second embodiment of this invention, since the concentration of the plutonium of the fuel rod containing the plutonium is set in accordance with the containing rate of plutonium isotope Pu-240, the reactivity change caused by the difference of the composition of the plutonium isotope can be easily and reasonably compensated for.

Furthermore, according to the third embodiment of this invention, since a predetermined composition of the plutonium isotope is obtained by deciding the mixing ratio in accordance with the difference in the Pu-240 amount with respect to the plutonium having different isotope composition, the concentration can be easily corrected even if the amount of Pu-240 assumed at the design time differs from the amount actually obtained.

Still furthermore, according to the fourth embodiment of this invention, since the concentration of the fuel rod containing the plutonium is corrected in accordance with the composition of the plutonium, the cooling period of spent fuel and the period until the plutonium and the uranium are mixed, fabricated and then loaded into the core after the reprocessing, more accurate setting of the concentration can be done.

Still furthermore, according to the fifth embodiment of this invention, since the plutonium concentration of the fuel rod containing plutonium is set in accordance with a predetermined equation containing the enrichment of the uranium fuel, the power peaking factor of the fuel rod containing the plutonium can be relatively lowered with respect to that of the uranium fuel rod.

I claim:

1. A thermal neutron type reactor in which fuel rods utilizing U-235 enriched uranium-oxide are bundled in a lattice arrangement, wherein a portion of the fuel rods in the lattice arrangement includes MOX fuel rods containing plutonium, wherein a composition of plutonium isotopes is set in accordance with a relationship between a containing rate of Pu-240 as a non-fissile plutonium isotope and a sum of containing rates of Pu-239 and Pu-241 as fissile plutonium isotopes and, wherein, with respect to plutonium having different isotopic compositions, a mixture ratio of plutonium is in accordance with a proportional relationship corresponding to a difference of the containing rate of PU-240 from a designed containing rate, and for plutonium having different isotopic compositions than the designed composition, the concentrations of plutonium in the MOX fuel rods are in accordance with a proportional relationship corresponding to a difference from the designed containing rate of Pu-240.

2. A thermal neutron type reactor in which fuel rods utilizing U-235 enriched uranium-oxide are bundled in a lattice arrangement, wherein a portion of the fuel rods in the lattice arrangement includes MOX fuel rods containing plutonium, wherein a concentration of fissionable plutonium is in accordance with a tentative plutonium isotopic composition at a design stage with a concentration in accordance with a difference of the isotopic composition with respect to plutonium having a different isotopic composition such that a containing rate of Pu-240 as a non-fissile plutonium isotope of the tentative plutonium isotopic composition is regarded as a standard and the concentration of the plutonium is a concentration of a sum of fissile plutonium isotopes of Pu-239 and PU-241 multiplied by a correction factor proportional to a difference of the containing rate of the Pu-240 with respect to the concentration of the sum of fissionable plutonium isotopes at a containing rate of the standard Pu-240 by a proportional relationship of a straight line which has an inclination more than an inclination of a tangential line to a curve defining a relation between the sum of fissionable plutonium to the Pu-240 in the fissionable plutonium to the set Pu-240 when the containing rate of the Pu-240 is smaller than the standard, having an inclination not exceeding an inclination of said tangential line to said curve for the sum of fissionable plutonium to the set Pu-240 when the containing rate of the Pu-240 is larger than the standard, and crossing said curve at a point at which the Pu-240 containing rate is larger than the standard Pu-240 containing rate and at a point at which the Pu-240 containing rate is smaller than the standard Pu-240 containing rate.

3. A thermal neutron type reactor in which fuel rods utilizing U-235 enriched uranium-oxide are bundled in a lattice arrangement, wherein a portion of the fuel rods in the lattice arrangement includes MOX fuel rods containing plutonium and wherein concentrations of the plutonium are corrected in accordance with a containing rate of Pu-241 and Am-241 in the plutonium, which depends on a cooling period of spent fuel and a period from the time of the recovery of plutonium obtained by reprocessing treatment of spent $UO_2$ fuels to loading into a core using a mixture of plutonium-oxide with natural or depleted uranium-oxide.

4. A thermal neutron type reactor in which fuel rods utilizing U-235 enriched uranium-oxide are bundled in a lattice arrangement, wherein a portion of the fuel rods in the lattice arrangement includes MOX fuel rods containing plutonium and the concentration Pi of the said plutonium is in accordance with the following equation including a U-235 enrichment ei of the U-235 enriched uranium-oxide fuel rod $$Pi = (ei - eB) \cdot Q$$

$$Q \leq 1.2$$

eB: U-235 concentration contained in natural or depleted uranium of a fuel mixed with plutonium.

5. A mixed oxide (MOX) fuel design and manufacturing method for MOX fuel comprising the steps of:
 (a) setting a plutonium concentration for the MOX fuel for required core characteristics and reactivity at a MOX fuel design stage based on a plutonium isotope composition which is anticipated to be used when manufacturing said MOX fuel, plutonium oxide $PuO_2$ for said MOX fuel having an estimated americium Am-241 containment ratio;
 (b) obtaining plutonium oxide $PuO_2$ which is mixed with $UO_2$ as an actual MOX fuel element at the time of MOX fuel manufacture; and
 (c) when the americium Am-241 containment ratio of actually obtained plutonium differs from said estimated americium Am-241 containment ratio at the time of MOX fuel design, determining a mixing ratio of natural or depleted $UO_2$ and $PuO_2$ according to an americium Am-241 containment ratio in said actually obtained plutonium such that the actual MOX fuel has the reactivity set at the MOX fuel design stage.

6. A MOX fuel design and manufacturing method as claimed in claim 5, further comprising the step of:
 if there is a variation in a Pu-240 containment ratio of batches of the actually obtained plutonium, determining a mixing ratio of each $PuO_2$ batch according to said variation and mixing each batch to coincide with an estimated Pu-240 containment ratio.

7. A MOX fuel design and manufacturing method as claimed in claim 5, further comprising the step of:
 if a procured plutonium Pu-240 isotope containment ratio differs from an estimate at the MOX fuel design stage, in accordance with a degree of difference between an actual plutonium Pu-240 containment ratio and an estimated plutonium Pu-240 containment ratio at the MOX fuel design stage, compensating a concentration of $PuO_2$ mixed with natural or depleted $UO_2$ using a proportional relationship of a Pu-239 and Pu-241 sum and a Pu-240 containment ratio to obtain said required core characteristics.

* * * * *